United States Patent [19]

Hannemann

[11] Patent Number: 4,677,179
[45] Date of Patent: Jun. 30, 1987

[54] STORAGE STABLE, HEAT CURABLE, COATING COMPOSITION

[75] Inventor: Gerd K. Hannemann, Mannheim, Fed. Rep. of Germany

[73] Assignee: W. R. Grace, New York, N.Y.

[21] Appl. No.: 875,121

[22] Filed: Jun. 17, 1986

Related U.S. Application Data

[63] Continuation-in-part of Ser. No. 849,838, Apr. 9, 1986.

[51] Int. Cl.$^4$ ............................................... C08G 18/80
[52] U.S. Cl. ........................................ 528/45; 528/48; 528/52; 528/58
[58] Field of Search ......................... 528/45, 48, 52, 58

[56] References Cited

U.S. PATENT DOCUMENTS

| | | | |
|---|---|---|---|
| 3,694,389 | 9/1972 | Levy | 528/45 |
| 3,857,818 | 12/1974 | Frizelle | 260/77.5 |
| 4,034,017 | 7/1977 | Chang et al. | 528/45 |
| 4,248,756 | 2/1981 | Koenig et al. | 427/385.5 |
| 4,400,497 | 8/1983 | Blum et al. | 528/45 |
| 4,409,340 | 11/1983 | Stolzenbach et al. | 521/159 |
| 4,442,146 | 4/1984 | Holubka | 427/386 |
| 4,456,739 | 6/1984 | Holubka et al. | 525/510 |
| 4,456,740 | 6/1984 | Holubka et al. | 525/528 |
| 4,463,143 | 7/1984 | Holubka | 525/528 |

*Primary Examiner*—Maurice J. Welsh

*Attorney, Agent, or Firm*—Richard P. Plunkett; William W. McDowell, Jr.

[57] ABSTRACT

This invention provides a novel storage stable, heat curable, coating composition comprising
  (a) a ketoxime blocked polyisocyanate,
  (b) a polyol containing 2-4 terminal OH groups,
  (c) at least one ethylenically unsaturated monomer, oligomer or prepolymer of the formula:

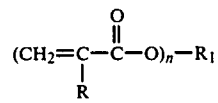

wherein R is H or $CH_3$, $R_1$ is an organic moiety and n is 1 and preferably at least 2,
  (d) a free radical thermal initiator for (c), and
  (e) a deblocking and curing catalyst for (a).

The reaction between (a) and (b) in the composition results in a thermoset material which is believed to form an interpenetrating network with the resulting thermoset from (c) on thermal curing.

The coating composition which is airless sprayable, storage stable and can be cured at low temperatures (about 80°–120° C.) provides a coating having good adhesion to metal surfaces with good abrasion resistance and good corrosion protection.

16 Claims, No Drawings

STORAGE STABLE, HEAT CURABLE, COATING COMPOSITION

This application is a continuation-in-part of copending application having Ser. No. 849,838, filed Apr. 9, 1986.

BACKGROUND OF THE INVENTION

1. Field of the Invention

This invention relates to coating compositions. More particularly, it relates to solventless, one component, airless sprayable and abrasion resistant polyurethaneacrylate coatings with low curing temperatures.

2. Description of the prior Art

Solvent based resin compositions containing diblocked diisocyanate urea urethane oligomers and coating compositions comprising same are known from U.S. Pat. No. 4,463,143. Additionally, U.S. 4,409,340 teaches a heat curable coating composition consisting essentially of a prepolymer with ketoxime-blocked NCO groups, a diamine crosslinker, optionally an organic solvent and pigments, fillers, blowing agents and other known additives.

U.S. Pat. No. 3,694,389 teaches thermosetting coating compositions which comprise a ketoxime-blocked polyisocyanate and a solution copolymer of an active hydrogen-containing monoethylenically unsaturated compound which is catalyzed by an organo-soluble zinc salt.

U.S. Pat. No. 4,400,497 teaches mixtures comprising a polyisocyanate in the form of discrete particles and a polyol which is useful as coatings and adhesives.

U.S. Pat. No. 4,442,146 teaches a solvent based resin composition comprising a chain-extendable, crosslinkable, diblocked diisocyanate, diurea oligomer, a polyepoxide and an organic solvent.

U.S. Pat. No. 4,456,740 teaches a resin composition comprising chain-extendable, crosslinking polyol having at least three hydroxyl groups, a chain-extendable, diblocked diisocyanate, diurethane oligomer reaction product of a diol with a half-blocked diisocyanate and a crosslinking agent reactive with the hydroxyl functionality of said polyol and substantially unreactive with the de-blocked isocyanate functionality of said diblocked diisocyanate diurethane oligomer.

U.S. Pat. No. 4,456,739 teaches a resin composition comprising a chain-extendable, crosslinkable polyol being the reaction product of a diepoxide with a diol, said polyol having at least three hydroxyl groups, a chain-extendable, diblocked diisocyanate diurea oligomer and a crosslinking agent reactive with the hydroxyl functionality of said polyol and substantially unreactive with the de-blocked isocyanate functionality of said diblocked, diisocyanate diurea oligomer.

U.S. Pat.No. 4,248,756 teaches a thermosetting, two-component coating composition containing a ketoxime-blocked aromatic isocyanate and specific amine crosslinking agents.

U.S. Pat. No. 3,857,818 teaches a powder coating composition comprising a mixture of ketoxime-blocked isocyanate prepolymer and a hydroxy-functional resin.

The aforesaid prior art has various disadvantages. For example, the solvent containing materials present toxicity and in some cases flammability hazards along with pollution problems. Government regulations are now requiring lowering of the volatile organic content ("VOC") in various industries including the automotive industry which uses said coatings as underbody coatings. Additionally, some of the above prior art compositions have too elevated a curing temperature to be operable in present day commercial ovens which provide temperatures in the range 100°–150° C.

One object of the instant invention is to provide a one component, storage stable, heat curable, solventless, coating composition. Another object of the instant invention is to provide an airless sprayable coating composition. A further object of the invention is to provide a coating composition with a curing temperature in the range 80°–120°0 C. Still another object of the invention is to provide a coating which is abrasive resistant and has good adhesion to metal substrates. A still further object of the instant invention is to provide a coating which provides good corrosion protection. Other objects will become apparent from a reading hereinafter.

DESCRIPTION OF THE INVENTION

This invention relates to a heat curable coating composition comprising
 (a) a ketoxime blocked polyisocyanate,
 (b) a polyol containing 2–4 terminal OH groups,
 (c) at least one ethylenically unsaturated monomer, oligomer or prepolymer of the formula:

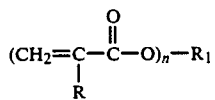

wherein R is H or CH$_3$, R$_1$ is an organic moiety and n is 1 and preferably at least 2,
 (d) a free radical thermal initiator for (c), and
 (e) a deblocking and curing catalyst for (a).

The reaction between (a) and (b) in the composition results in a thermoset material which is believed to form an interpenetrating network with the resulting thermoset from (c) on thermal curing. The functional groups in each of the crosslinking reactants, i.e., blocked isocyanate and crosslinking agent, must be at least two and the sum of the functional groups must be greater than four to obtain the desired thermoset material on de-blocking and curing. Thus, if one uses a ketoxime blocked polyisocyanate which is trifunctional, one can use a difunctional polyol and still obtain a thermoset material. On the other hand, one can use a ketoxime blocked diisocyanate (difunctional) in combination with a tri- or tetrafunctional polyol, e.g., a triol, and obtain a thermoset material. Since the (c) component in the composition, i.e., the ethylenically unsaturated monomer, oligomer or prepolymer on thermal curing, results in a thermoset material, the resultant cured coating is believed to be an interpenetrating network.

The coating composition which is airless sprayable, storage stable and can be cured at low temperatures (80°–120° C.) provides a coating having good adhesion to metal surfaces with good abrasion resistance and good corrosion protection.

Generally, the ketoxime-blocked isocyanate of the compositions of the invention are easily prepared by reacting an isocyanate with a ketoxime in the absence of a solvent. However, the reaction proceeds readily when the oxime and the isocyanate are mixed in a solvent which is inert to the reaction, such as benzene, toluene, xylene or similar unreactive hydrocarbon. The ketoximes are prepared by the well known reaction of hydroxylamine hydrochloride with a ketone. Other well-known methods for preparing ketoximes, such as the reaction of a hydrocarbon with nitrosyl chloride, according to the procedure of Naylor and Anderson, J. Org. Chem., 18, 115 (1953), are also operable. A wide variety of ketoximes can be used to make the blocked isocyanates. The choice of ketoxime is not critical and will depend mainly on the cost of the starting ketone and may also depend in part on the volatility of the oxime. Among the oximes which can be used in making the ketoxime-blocked isocyanates are acetone oxime, 2-butanone oxime, 3-methyl-2-butanone oxime, 2-pentanone oxime, 3-pentanone oxime, 4-methyl-2-pentanone oxime, 2-heptanone oxime, 3-heptanone oxime, cyclohexanone oxime, actophenone oxime and the like. An especially preferred ketoxime is the oxime of 2-butanone.

Substantially, any polyisocyanate, including prepolymers with polyols having terminal -NCO groups, can be used in making the blocked isocyanates employed herein. As used in the present specification and claims, the terms "polyisocyanate" and "polyfunctional isocyanate" mean any compound, monomeric or polymeric, having two or more -NCO groups. The isocyanates which are used in the compositions of the invention are known materials.

Among the polyisocyanates which can be used in the compositions of the invention are aliphatic isocyanates such a 1,6-hexamethylene diisocyanate, 1,8-octamethylene diisocyanate, 1,12-dodecamethylene diisocyanate, 2,2,4-trimethylhexamethylene diisocyanate and similar alkylene diisocyanates, 3,3'-diisocyanatodipropyl ether, 3-isocyanatomethyl-3,5,5-trimethylcyclohexyl isocyanate, cyclopentylene-1,3-diisocyanate, cyclohexylene-1,4-diisocyanate, methyl 2,6-diisocyanatocaproate and related isocyanates, bis(2-isocyanatoethyl)fumarate, 4-methyl-1,3-diisocyanatocyclohexane, trans-vinylene diisocyanate and similar unsaturated isocyanates, 4,4'-methylene-bis(cyclohexyl isocyanate) and related isocyanates, menthane diisocyanate, N,N',N"-tris(6-isocyanatohexamethylene) biuret and related isocyanates, bis(2-isocyanatoethyl)carbonate and similar carbonate diisocyanates, as well as other known isocyanates derived from aliphatic polyamines, aromatic isocyanates, such as tolylene diisocyanates, xylylene diisocyanates, dianisidine diisocyanate, 4,4'-diphenylmethane diisocyanate, 1-ethoxy-2,4-diisocyanatobenzene, 1-chloro-2,4-diisocyanatobenzene, tris(4-isocyanatophenyl)methane, naphthalene diisocyanates fluorene diisocyanates, 4,4'-biphenyl diisocyanate; phenylene diisocyanates, 3,3'-dimethyl-4,4'-biphenyl diisocyanate, p-isocyanatobenzyl isocyanate tetrachloro1,3-phenylene diisocyanate and related isocyanates, 2,4,6-tribromo-1,3-phenylene diisocyanate, bis(2-isocyanatoethyl)benzene, prepolymers of polyisocyanates with polyhydroxyl or polyamine compounds, such as prepolymers of 3-isocyanatomethyl-3,3,5-trimethylcyclohexylisocyanate, tolylene diisocyanate, menthane diisocyanate, 4,4'-methylene-bis(cyclohexylisocyanate), 4,4'-methylene-bis(isocyanatocyclohexane), 2, isocyanatoethyl-6-isocyanatocaproate and the like with polyether polyols, polyester polyols and the like.

The preparation of the isocyanate prepolymers useful in the composition of the invention is well known in the art. Generally, the preparation of these prepolymers involves the reaction of a polyol, e.g., a hydroxyl-terminated polyester, polyester amide, polyether or other polyfunctional active hydrogen compound, with a di-isocyanate or other polyisocyanate, preferably using an excess of the isocyanate to yield an isocyanate terminated prepolymer product. The polyol used to make the blocked polyisocyanate has a hydroxyl functionality in the range 2 to 4 and can range in molecular weight from about 500 to about 10,000. The polyol is preferably hydrophobic. A preferred polyol is a hydrophobic polyether triol of a molecular weight of about 800 to 2,000 which affords the desired low viscosity for spraying of the uncured composition and assures that the cured coating has good abrasion performance even after exposure to humid or wet environmental conditions. An extensive description of some of the useful techniques for preparing the isocyanate prepolymers can be found in J. H. Saunders and K. C. Frisch, Polyurethanes: Chemistry and Technology, Part II, Interscience (New York, 1964), especially on pages 8 to 49, and in the various references cited by Saunders and Frisch. Other preparative techniques which are known in the art can also be employed.

Other polyfunctional isocyanates which are useful in the compositions of the invention are disclosed in U.S. Pat. Nos. 3,162,664, 3,427,346, 3,275,679, 3,352,830, 2,729,666, 2,768,154, 3,267,122, 3,281,378, 3,124,605, 2,718,516, as well as isocyanates prepared from the amines disclosed in U.S. Pat. No. 3,256,318. Other polyisocyanates, such as those containing silicon and phosphorus can also be used in making the compositions of the invention.

The polyol used for the crosslinking reaction has a hydroxyl functionality of at least two and can range in M.W. from about 500 to about 10,000. It is preferably a hydrophobic polyether diol of about 2,000 to 4,000 M.W. that is end-tipped with primary -OH groups in order to achieve a rapid crosslinking reaction with the blocked polyisocyanate in the temperature range of 80° to 120° C.

To achieve optimum strength and abrasion resistance properties, the preferred trifunctional—NCO blocked polyisocyanate is crosslinked with the stoichiometric amount of primary—OH tipped polymeric diol crosslinking agent. However, deviations from the stoichiometric amount are possible and may be desired to influence other desirable properties such as the viscosity of the final sprayable composition. As much as 33% below and above the theoretical amount of polyol crosslinking agent for the stoichiometric reaction may be employed.

The composition also contains from 1 to 50 by weight of an ethylenically unsaturated monomer, oligomer or prepolymer of the formula:

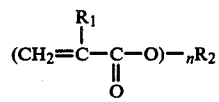

wherein $R_1$ is H or $CH_3$ and $R_2$ is an organic moiety having the valence of n and n is 1 and preferably at least 2. Such reactive diluents include, but are not limited to, trimethylolpropane triacrylate, hexanediol diacrylate, 1,3-butylene glycol diacrylate, diethylene glycol diacrylate, 1,6-hexanediol diacrylate, neopentyl glycol diacrylate, polyethylene glycol 200 diacrylate, tetraethylene glycol diacrylate, triethylene glycol diacrylate, pentaerythritol tetraacrylate, tripropylene glycol diacrylate, ethoxylated bisphenol-A diacrylate, trimethylolpropane triacrylate, di-trimethylolpropane tetraacrylate, triacrylate of tris(hydroxyethyl) isocyanurate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate, pentaerythritol diacrylate and the like which can be added to the composition to modify the cured product. Monoacrylates such as cyclohexyl acrylate, isobornyl acrylate and tetrahydrofurfuryl acrylate and the corresponding methacrylates are also operable as reactive diluents.

The thermal initiators used herein for curing the ethylenically unsaturated monomer, oligomer or prepolymer are free radical initiators selected from substituted or unsubstituted pinacols, azo compounds, thiurams, organic peroxides and mixtures thereof.

The organic peroxides operable are of the general formula:

$$R-O-O-(R_I-O-O)_n-R$$

wherein n=0 or 1, R is independently selected from hydrogen, aryl, alkyl, aryl carbonyl, alkaryl carbonyl, aralkyl carbonyl and alkyl carbonyl and $R_1$ is alkyl or aryl, said alkyl groups containing 1 to 20 carbon atoms.

Examples of operable organic peroxides include, but are not limited to 2,5-dimethyl-2,5-di(t-butylperoxy)-hexane, 1,3-bis(t-butylperoxyisopropyl)benzene, 1,3-bis-(cumylperoxyisopropyl)benzene, 2,4-dichlorobenzoyl peroxide, caprylyl peroxide, lauroyl peroxide, t-butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane and di-t-butyl peroxide.

Examples of azo compounds operable herein include, but are not limited to, commercially available compounds such as 2-t-butylazo-2-cyanopropane; 2,2'-azobis-(2,4-dimethyl-4-methoxy-valeronitrile); 2,2'-azobis-(isobutyronitrile); 2,2'-azobis(2,4-dimethylvaleronitrile) and 1,1'-azobis(cyclohexanecarbonitrile).

The thiurams operable as thermal initiators herein are of the formula:

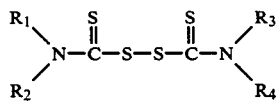

wherein $R_I$, $R_2$, $R_3$ and $R_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, $R_I$ and $R_2$ and $R_3$ and $R_4$ can each be a divalent alkylene group ($-C_nH_{2n}-$) having from 2 to about 12 carbon atoms, a divalent alkenylene group ($-C_nH_{2n-2}-$) group having from 3 to about 10 carbon atoms, a divalent alkadienylene group ($-C_nH_{2n-4}-$) having from 5 to about 10 carbon atoms, a divalent alkatrienylene group ($-C_nH_{2n-6}-$) having from 5 to about 10 carbon atoms, a divalent alkyleneoxyalkylene group ($-C_xH_{2x}-OC_xH_{2x}-$) having a total of from 4 to about 12 carbon atoms or a divalent alkyleneaminoalkylene group:

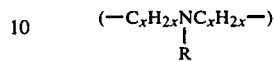

having a total of from 4 to about 12 carbon atoms.

Operable thiurams include, but are not limited to, tetramethylthiuram disulfide, tetraethylthiuram disulfide, di-N-pentamethylenethiuram disulfide, tetrabutylthiuram disulfide, diphenyldimethylthiuram disulfide, diphenyl-diethylthiuram disulfide, diethyleneoxythiuram disulfide and the like.

The substituted or unsubstituted pinacols operable herein as a thermal initiator have the general formula:

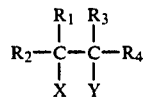

wherein $R_I$ and $R_3$ are the same or different substituted or unsubstituted aromatic radicals, $R_2$ and $R_4$ are substituted or unsubstituted aliphatic or aromatic radicals and X and Y which may be the same or different are hydroxyl, alkoxy or aryloxy.

Preferred pinacols are those wherein $R_I$, $R_2$, $R_3$ and $R_4$ are aromatic radicals, especially phenyl radical, and X and Y are hydroxyl.

Examples of this class of compounds include, but are not limited to, benzopinacol, 4,4'-dichlorobenzopinacol, 4,4'-dibromobenzopinacol, 4,4'-diiodobenzopinacol, 4,4', 4'', 4'''-tetrachlorobenzopinacol, 2,4-2',4'-tetrachlorobenzopinacol, 4,4'-dimethylbenzopinacol, 3,3'-dimethylbenzopinacol, 2,2'-dimethylbenzopinacol, 3,4-3',4'-tetramethylbenzopinacol, 4,4'-dimethoxybenzopinacol, 4,4', 4'', 4'''-tetramethoxybenzopinacol, 4,4'-diphenylbenzopinacol, 4,4'-dichloro-4'', 4'''-dimethylbenzopinacol, 4,4'-dimethyl-4'',4'''-diphenylbenzopinacol, xanthonpinacol, fluorenonepinacol, acetophenonepinacol, 4,4'-dimethylacetophenone-pinacol, 4,4'-dichloroacetophenonepinacol, 1,1,2-triphenyl-propane-1,2-diol, 1,2,3,4-tetraphenylbutane-2,3-diol, 1,2-diphenylcyclobutane-1,2-diol, propiophenone-pinacol, 4,4'-dimethylpropiophenone-pinacol, 2,2'-ethyl-3,3'-dimethoxypropiophenone-pinacol, 1,1,1,4,4,4-hexafluoro 2,3-diphenyl-butane-2,3-diol.

As further thermal initiators according to the present invention, there may be mentioned: benzopinacol monomethylether, benzopinacol monophenylether, benzopinacol monoisopropyl ether, benzopinacol monoisobutyl ether, benzopinacol mono (diethoxymethyl) ether and the like.

The thermal initiators or mixtures thereof are usually added in amounts ranging from 0.01–10% by weight of the total composition.

The de-blocking and curing catalysts operable in the instant invention include the tin containing catalysts such as dibutyl tin dilaurate. Although it has been found that conventional tertiary amines, e.g., triethylenediamine are inoperable to catalyze the curing reaction herein, surprisingly it has been found that the addition of primary/secondary amines as deblocking agents and co-catalysts herein include, but are not limited to, tretraethylenepentamine, triethylenetetramine and diethylenetriamine. These catalysts are added in an amount in the range 0.01-5.0% by weight of the composition.

The thermal deblocking and cure is usually carried out at temperatures in the range 80°-150° C, preferably 100°-120° C. Full cures are usually obtained in 30 minutes.

In addition, conventional additives can be added to the composition. Such additives include wetting agents, pigments, dispersants, corrosion inhibitors, fillers and the like all of which are known to those skilled in the art. Furthermore, adhesion promoters such as silanes which are known to promote adhesion between organic and inorganic substances can also be added to the composition. Such materials are well known and include, but are not limited to, vinyltriethoxysilane, vinyltri(2-methoxyethoxy)silane, gamma-methacryloxypropyltrimethoxysilane, gamma-aminopropyltriethoxysilane, and N-beta-(aminoethyl)gamma-aminopropyltrimethoxysilane.

The cured coatings are tested for abrasion resistance in both the dry and wet state on a Shot Blaster manufactured by Auer, Mannheim, West Germany (Model Strahlanlage-ST800A). The dry or wet coatings to be tested generally are cured at 100°-150° C. for 30 minutes prior to abrasion testing. The coatings to be tested wet are covered with a ¼" thick absorbent cotton which has been soaked in demineralized water. The cotton covered test panel is put in a polyethylene bag and sealed and then put in a second polyethylene bag and sealed. The panel is then placed in an oven at 70° C. for one week. The cotton is then removed from the panel and both bags resealed and the panel is put in a cold chamber maintained at −20° C. for 2 hours. The sample is removed from the bags and allowed to come to room temperature then conditioned at 23° C, 50% RH for 2 to 4 hours before abrasion testing.

The Shot Blaster abrasion test is the same for both the dry and wet panels. The test consists of shot blasting the urethane polymer coated panel with a crushed spherical cast steel shot type GP-14 Wheelabrator-Allevard at an air pressure of 70 psi at an angle of 60° until full penetration of the coating to expose bare steel is visibly noted. For dry samples a blasting period in excess of 00 seconds is considered acceptable. For wet samples a blasting period greater than 200 seconds is acceptable. In all instances, unless otherwise noted, the viscosity of the compositions prior to curing was measured by a Brookfield Viscometer at room temperature (RT) at 3-60 RPM using spindle #4.

The following examples will aid in explaining, but expressly not limit the instant invention. Unless otherwise noted, all parts and percentages are by weight.

EXAMPLE 1

Basic Formulation

A poly(oxypropylene)triol of 1,000 MW commercially available under the tradename "Niax LG 168" from Union Carbide is terminated with toluene diisocyanate at 80° C. and the residual isocyanates are subsequently blocked with 2-butanone oxime at 90°-95° C., until the NCO-number is below 0.01 meq/g, as determined by titration. This blocked isocyanate prepolymer, referred to herein as Blocked Prepolymer-A, is mixed with an equivalent weight of an ethylene oxide tipped poly(oxypropylene)diol of 2,000 MW commercially available under the tradename "Pluracol-492" from BASF, which acts as crosslinking agent. To decrease the viscosity of the formulation and to form an interpenetrating network in the cured coating, the sample is mixed with 20 pph (based on the weight of the blocked isocyanate and the crosslinking agent) ethylene glycol dimethacrylate as a reactive diluent, 0.3 pph dibutyltindilaurate (DBTDL) as a catalyst for the deblocking and curing reaction and 0.05 pph of 1,1-di(t-butylperoxy)-3,5,5-trimethylcyclohexane (Lupersol 231 commerically available from Pennwalt) as a free radical thermal initiator for the dimethacrylate monomer.

The viscosity of the mixture was 980 cps as measured by a Brookfield Viscometer at RT, spindle #4 and increased to 1,600 after storage at 40°-47° C. for 3 days. The mixture was then drawn down on a "3×6" steel panel electrocoated with a composition conventionally used in the automotive industry, such as that commercially available from PPG under the tradename "ED-3076". The coating was dried over night to a thickness in the range 7-15 mils. The dried coated panel was cured in a forced air oven for 30 minutes at 120° C. resulting in a slightly tacky, elastomeric coating. The abrasion resistance measured on a dry sample on the Shot Blaster was 370 seconds at a layer thickness of 10 mils.

By contrast, the same formulation without ethylene glycol dimethacrylate but with 20 pph di-isodecyl phthalate as a non-reactive diluent was higher in viscosity (Brookfield, RT, spindle #4, 2,700 cps) and was not curable to an abrasion resistant, 10-mil thick coating at 120° C. in 30 minutes oven time.

EXAMPLE 2

Tripropyleneglycol Diacrylate as Viscosity Reducer

The same formulation employed in Example 1 was mixed with 20 pph tripropylene glycol diacrylate instead of ethylene glycol dimethacrylate. This sample has a viscosity of 390 cps (Brookfield, RT, spindle #4 and was storage stable for 3 days at 40° C. (1,600 cps). The sample coated as in Example 1 cured to a tack-free, interpenetrating network coating at 120° C. in 30 minutes.

The abrasion resistance on a dry sample as measured by the Shot Blaster method was 450 seconds at a 12-mil coating thickness.

By contrast, the same formulation comprising the same amount of di-isodecyl azealate instead of the tripropylene glycol diacrylate was higher in viscosity (1,800 cps, Brookfield, RT, spindle #4) and the abrasion performance of a dry coated sample was 160 seconds at a 10-mil layer according to the Shot Blaster test after a 30-minute, 120° C. cure.

EXAMPLE 3

Tetraethylenepentamine as a Deblocking Agent and Co-catalyst for Curing

Blocked Prepolymer-A, from Example 1, an equivalent weight of Pluracol-492, 20 pph of ethylene glycol dimethacrylate, 0.3 pph DBTDL, 0.05 pph Lupersol 231 and, additionally, 0.3 pph of tetraethylenepentamine as a deblocker and co-catalyst were mixed together.

This sample was coated as in Example 1 and cured to a fully crosslinked coating by exposing the material to a 30-minute, 110° C. cure. In the dry Shot Blaster abrasion test, a 10-mil layer of the coating lasted 342 seconds. The same formulation without the tetraethylenepentamine or with 0.3 pph triethylenediamine (DABCO) as a co-catalyst was not curable at all to a crosslinked film after a 30-minute, 110° C. cure.

EXAMPLE 4

Alkoxy Amino Silane as an Adhesion Promoter

To the same crosslinkable sample used in Example 3, an additional 0.3 pph of an alkoxy amino silane was added as an adhesion promoter, to improve the adhesion to the electro-coat and thereby give better abrasion resistance.

When cured at 120° C. for 30 minutes, on an electro-coated panel, the coating provided a Shot Blaster abrasion result of 1,580 seconds at a 14-mil thick layer as opposed to 1,254 seconds at 15 mils as for the same formulation omitting the amine silane as adhesion promoter.

EXAMPLE 5

Performance Comparison with a Commercially Available Blocked Isocyanate Formulation A blend of 1 mole of Blocked Prepolymer-A from Example 1 and 1 mole of a 2-butanone oxime blocked isocyanate formed from toluene diisocyanate and a polyether triol of 3,600 MW, referred to herein as Blocked Prepolymer-B, are mixed with 3-mole Pluracol-492 and subsequently 20 pph of ethylene glycol dimethacrylate, 0.3 pph DBTDL, 0.3 pph tetraethylenepentamine, 0.3 pph of alkoxyamino silane and 0.05 pph Lupersol-231 are added.

This formulation has an initial viscosity of 1,300 cps and 1,950 cps, respectively, after an accelerated storage stability test for 3 days at 40° C., according to Brookfield measurement at RT with spindle #4.

The dry Shot Blaster abrasion test lasted 810 seconds for a 13-mil coating, (coated as in Example 1) after a 30-minute, 120° C cure. In the more severe Shot Blaster wet test, a 15-mil coating on a panel lasted 201 seconds.

By contrast, a commercialized aliphatic blocked isocyanate and an equivalent weight of a polyether triol of 1,000 MW (Niax LG-168) as a coreactant and 25 pph Xylene/Cellusolve acetate as solvents instead of 20 pph ethylene glycol dimethacrylate, with all the other ingredients mentioned above in Example 5, had a viscosity of 1,150 cps and 1,500, respectively, after storage for 3 days at 40° C. After giving a coated panel a 30-minute, 120° C. cure, a rubbery, soft coating resulted. A dry Shot Blaster abrasion test of the coated panel at a coating thickness of 13 mils resulted in the coating lasting 285 seconds. By subjecting the panel to the wet conditions prior to the wet Shot Blaster test, the material becomes flowable again while stored at 70° C. for a week and runs off the panel.

EXAMPLE 6

Sprayable, Slightly Thixotropic Formulation as Chip-Resistant Automotive Sill Coating A scale-up batch (50 lbs) of Example 4 containing in addition 4 lbs of carbon black as a thixotropic agent is adjusted to a viscosity of 16 decipascal seconds (Rheomat-30, system 14, speed setting $350^{-1}$ s) by adding an additional 2 lbs of ethylene glycol dimethacrylate.

When heated up to 35°-40° C., as it is done with the currently used sill coating on the automotive assembly line, this material is easily airless-sprayable using a 48:1 pump, an inlet pressure of 60-70 psi (outlet pressure about 2,800 psi) and a spray nozzle of 180 microns in diameter. The attainable wet thickness without sagging and slumping is 450-500 microns, which is sufficient for a customary chip-resistant sill coat.

After spraying this material onto electro-coated panels and giving it a subsequent cure of 20 minutes at 130° C. +15 minutes at 120° C. +15 minutes at 110° C. (simulated primer and paint oven temperatures), the crosslinked coating is elastomeric and tack-free.

As against the aforesaid chip coating, a currently applied chip coating, i.e., a caprolactam blocked triol containing 25% volatile organic solvents, can only be cured at temperatures above 150° C.

EXAMPLE 7

Example 1 was repeated except that 20 pph of trimethylolpropane triacrylate were substituted for the ethylene glycol dimethacrylate as a reactive diluent. The mixture had a viscosity of 1,920 cps after 3 days at 40° C. After curing as in Example 1 an 11-mil thick cured dry coating has an abrasion resistance of 503 seconds when subjected to the Shot Blaster test. Similar results can be obtained by substituting tripropylene glycol diacrylate for the ethylene glycol dimethacrylate as a reactive diluent.

EXAMPLE 8

A commercially available poly(oxypropylene) ether triol of 700 molecular weight was terminated with toluene diisocyanate at 80° C., and the remaining isocyanates are subsequently blocked with 2-butanone oxime at 90°-95° C. until the NCO- number is below 0.05 meq/g, as determined by titration. Such a material can be used herein as a blocked isocyanate.

EXAMPLE 9

Example 1 was repeated except that an equivalent weight of a commercially available polypropylene glycol having a molecular weight of 2,025 was substituted for the ethylene oxide-tipped poly(oxypropylene) diol as a crosslinking agent. An 11-mil thick cured coating on a panel had an abrasion resistance of 375 seconds (dry sample) on being subjected to the Shot Blaster test.

On repeating this example, except substituting a commercially available polypropylene glycol having a molecular weight of 1,025 as the crosslinking agent, resulted in a 9-mil thick coating on a panel that withstood the abrasion resistance for 370 seconds (dry sample) on the Shot Blaster abrasion test.

This example shows the operability of secondary OH end groups on the crosslinking agent.

EXAMPLE 10

A poly(oxypropylene) triol of 1,000 molecular weight ("NIAX LG-168") was terminated with toluene diisocyanate at 80° C. and the residual isocyanate was subsequently blocked with acetoxime at 90°-95° C. until the NCO- number was below 0.05 meq/g, as determined by titration. This blocked isocyanate prepolymer can be used herein as the blocked isocyanate.

EXAMPLE 11

The composition and procedure of Example 1 is used except that an equivalent weight of an ethylene oxide-tipped poly(oxypropylene) diol of 3,850 molecular weight commercially available under the tradename "PLURACOL-628" from BASF was used as the crosslinking agent. After curing at 110° C., abrasion results similar to Example 1 were obtained.

EXAMPLE 12

The reactants and procedure of Example 1 were repeated except that in addition 20 pph of diallyl phthalate was added as a reactive plasticizer to the composition. After curing, a panel with a 10-mil thick coating (dry sample) had an abrasion resistance of 440 seconds in the Shot Blaster abrasion test.

EXAMPLE 13

The reactants and procedure of Example 1 were repeated except that an equivalent weight of a triol having a molecular weight of 6,700 commercially available under the tradename "PLURACOI-380" from BASF was substituted as the crosslinking agent. A coating comparable to that obtained in Example 1 resulted.

EXAMPLE 14

The reactants and procedure of Example 1 were repeated except that a tetrol having a molecular weight of 500 commercially available from BASF under the tradename "PLURACOL PEP-550" was substituted as a crosslinking agent. A coating with properties similar to that obtained in Example 1 resulted.

EXAMPLE 15

The reactants and procedure of Example 1 were followed except that the equivalent weight of the crosslinking agent consisted of ⅔ of the equivalent weight of a polyether triol (molecular weight 1,000 commercially available under the tradename "NIAX LG-168" from Union Carbide) and ⅓ of the equivalent weight of a captolactone-based polyester triol (molecular weight of 900–1,000 commercially available under the tradename "TONE- 0310" from Union Carbide). Results in the cured coating were comparable to those obtained in Example 1.

The example was repeated except that the captolactone-based polyester triol was replaced by a polycarbonate diol (MW 1,500) commercially available under the tradename "DURACARB-124" from PPG. The cured coating had properties comparable to those obtained in Example 1.

I claim:
1. A one component, storage stable, heat curable, airless sprayable, coating composition comprising
   (a) a ketoxime blocked polyisocyanate,
   (b) a polyol containing 2–4 terminal OH groups,
   (c) at least one ethylenically unsaturated monomer, oligomer or prepolymer of the formula:

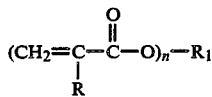

wherein R is H or $CH_3$, $R_1$ is an organic moiety and n is 1 to 4,
   (d) a free radical thermal initiator for (c), and
   (e) a deblocking and curing catalyst for (a).
2. The composition according to claim 1 wherein the polyisocyanate is a triisocyanate and the polyol is a diol.
3. The composition according to claim 1 wherein the polyisocyanate is a diisocyanate and the polyol is a triol.
4. The composition according to claim 1 containing in addition a silane as an adhesion promoter.
5. The composition according to claim 1 containing in addition a thixotropic agent.
6. The composition according to claim 1 wherein (a) and (b) are present in an equivalent weight ratio and (c) is present in an amount ranging from 1–50% by weight of (a) and (b).
7. The composition according to claim 1 wherein (e) is a member of the group consisting of an organic tin salt, polyalkylene polyamine and mixtures thereof.
8. The composition according to claim 7 wherein (e) is a mixture of dibutyl tin dilaurate and tetraethylenepentamine.
9. The process of forming a thermoset coating which comprises applying to a substrate a composition comprising
   (a) a ketoxime blocked polyisocyanate,
   (b) a polyol containing 2–4 terminal OH groups,
   (c) at least one ethylenically unsaturated monomer, oligomer or prepolymer of the formula:

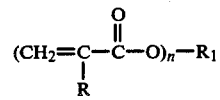

wherein R is H or $CH_3$, $R_1$ is an organic moiety and n is 1 to 4
   (d) a free radical thermal initiator for (c), and
   (e) a deblocking and curing catalyst for (a), and, thereafter, heating said coated substrate to a temperature in the range 80°–150° C.
10. The cured coating resulting from the process of claim 9.
11. The cured coating of claim 10 comprising in addition one or more of the functional additives selected from the group consisting of adhesion promoters, corrosion inhibitors, thixotropic agents, fillers and colorants.
12. A corrosion inhibiting, abrasive resistant, automotive underbody coating formed from the cured composition of claim 1.
13. A chip-resistant, automotive sill coating formed from the cured composition of claim 1.
14. A chip-resistant, automotive wheel well coating formed from the cured composition of claim 1.
15. The process of claim 9 wherein (e) is a member of the group consisting of an organic tin salt, polyalkylene polyamine and mixtures thereof.
16. The process of claim 15 wherein (e) is a mixture of dibutyl tin dilaurate and tetraethylenepentamine.

* * * * *